US011344882B2

(12) United States Patent
Meng et al.

(10) Patent No.: US 11,344,882 B2
(45) Date of Patent: May 31, 2022

(54) MICROFLUIDIC APPARATUS, AND METHOD OF DETECTING SUBSTANCE IN MICROFLUIDIC APPARATUS

(71) Applicant: BOE Technology Group Co., Ltd., Beijing (CN)

(72) Inventors: Xiandong Meng, Beijing (CN); Xianqin Meng, Beijing (CN); Jifeng Tan, Beijing (CN); Wei Wang, Beijing (CN); Xiaochuan Chen, Beijing (CN); Fangzhou Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 315 days.

(21) Appl. No.: 16/495,050

(22) PCT Filed: May 5, 2019

(86) PCT No.: PCT/CN2019/085562
§ 371 (c)(1),
(2) Date: Sep. 17, 2019

(87) PCT Pub. No.: WO2020/019812
PCT Pub. Date: Jan. 30, 2020

(65) Prior Publication Data
US 2021/0331161 A1    Oct. 28, 2021

(30) Foreign Application Priority Data

Jul. 26, 2018   (CN) .......................... 201810836353.3
Jul. 26, 2018   (CN) .......................... 201810837019.X
(Continued)

(51) Int. Cl.
*G01N 21/63*     (2006.01)
*G01N 21/64*     (2006.01)
(Continued)

(52) U.S. Cl.
CPC ....... *B01L 3/502715* (2013.01); *B01L 3/5023* (2013.01); *B01L 3/5027* (2013.01);
(Continued)

(58) Field of Classification Search
None
See application file for complete search history.

(56) References Cited

U.S. PATENT DOCUMENTS

| | | | |
|---|---|---|---|
| 4,687,329 A * | 8/1987 | Schultz ..................... | G01J 3/02 |
| | | | 250/226 |
| 6,940,593 B2 | 9/2005 | Farr | |

(Continued)

FOREIGN PATENT DOCUMENTS

| | | |
|---|---|---|
| CN | 101263372 A | 9/2008 |
| CN | 101636645 A | 1/2010 |

(Continued)

OTHER PUBLICATIONS

First Office Action in the Chinese Patent Application No. 201810930403.4, dated Jul. 1, 2020; English translation attached.

(Continued)

*Primary Examiner* — Neil N Turk
(74) *Attorney, Agent, or Firm* — Intellectual Valley Law, P.C.

(57) ABSTRACT

A microfluidic apparatus is provided. The microfluidic apparatus includes a first substrate having a first side and a second side opposite to each other; a grating layer on the second side of the first substrate, the grating layer including a plurality of grating blocks of different wavelength selectivity; a second substrate having a third side and a fourth side opposite to each other; the fourth side of the second substrate on a side of the third side away from the first substrate, and the second side of the first substrate on a side of the first side away from the second substrate; a light detection layer on (Continued)

the third side of the second substrate, the light detection layer including a plurality of detectors; and a microfluidic layer between the first substrate and the light detection layer, the microfluidic layer including a plurality of microfluidic channels.

18 Claims, 5 Drawing Sheets

(30) Foreign Application Priority Data

Jul. 27, 2018 (CN) .......................... 201810844548.2
Aug. 15, 2018 (CN) .......................... 201810930403.4

(51) Int. Cl.
| | | |
|---|---|---|
| *G01N 15/14* | (2006.01) | |
| *B01L 3/00* | (2006.01) | |
| *F21V 8/00* | (2006.01) | |
| *G01N 21/05* | (2006.01) | |
| *G02B 6/34* | (2006.01) | |
| *G01N 21/03* | (2006.01) | |

(52) U.S. Cl.
CPC .... *B01L 3/502707* (2013.01); *G01N 15/1436* (2013.01); *G01N 21/05* (2013.01); *G01N 21/63* (2013.01); *G01N 21/645* (2013.01); *G01N 21/6454* (2013.01); *G02B 6/0033* (2013.01); *G02B 6/34* (2013.01); *B01L 2200/025* (2013.01); *B01L 2300/0627* (2013.01); *B01L 2300/0877* (2013.01); *G01N 15/1484* (2013.01); *G01N 2021/0346* (2013.01); *G01N 2021/052* (2013.01); *G01N 2201/0633* (2013.01); *G01N 2201/0635* (2013.01)

(56) References Cited

U.S. PATENT DOCUMENTS

| | | | |
|---|---|---|---|
| 9,703,042 B2 | 7/2017 | Mossberg et al. | |
| 2004/0263841 A1* | 12/2004 | Caracci .............. | G02B 27/1086 356/300 |
| 2005/0227252 A1* | 10/2005 | Moon .............. | G01N 33/54313 435/6.18 |
| 2006/0227325 A1 | 10/2006 | Rulison et al. | |
| 2011/0242670 A1 | 10/2011 | Simmonds | |
| 2014/0253923 A1 | 9/2014 | Shibayama et al. | |
| 2014/0262783 A1* | 9/2014 | Chang ................. | B01F 13/0071 204/452 |
| 2015/0010271 A1 | 1/2015 | Beausoleil et al. | |
| 2015/0132003 A1 | 5/2015 | Greiner et al. | |
| 2016/0116409 A1 | 4/2016 | Massetti et al. | |
| 2017/0052384 A1 | 2/2017 | Santori et al. | |
| 2017/0227464 A1 | 8/2017 | Astier et al. | |
| 2018/0188152 A1 | 7/2018 | Vercruysse | |
| 2019/0033507 A1 | 1/2019 | Wang et al. | |

FOREIGN PATENT DOCUMENTS

| | | |
|---|---|---|
| CN | 101663576 A | 3/2010 |
| CN | 102073103 A | 5/2011 |
| CN | 102507448 A | 6/2012 |
| CN | 102954938 A | 3/2013 |
| CN | 103842783 A | 6/2014 |
| CN | 103999303 A | 8/2014 |
| CN | 104297155 A | 1/2015 |
| CN | 104498582 A | 4/2015 |
| CN | 105548096 A | 5/2016 |
| CN | 106471415 A | 3/2017 |
| CN | 107607475 A | 1/2018 |
| CN | 107850537 A | 3/2018 |
| CN | 108255028 A | 7/2018 |
| JP | 2002310796 A | 10/2002 |
| WO | 2011110084 A1 | 9/2011 |

OTHER PUBLICATIONS

Decision of Rejection in the Chinese Patent Application No. 201810836353.3, dated Jul. 29, 2020; English translation attached.
International Search Report & Written Opinion dated Aug. 8, 2019, regarding PCT/CN2019/085562.
First Office Action in the Chinese Patent Application No. 201810844548. 2, dated Apr. 23, 2020; English translation attached.
Second Office Action in the Chinese Patent Application No. 201810836353.3, dated Apr. 8, 2020; English translation attached.
Third Office Action in the Chinese Patent Application No. 201810836353.3, dated Apr. 15, 2022; English translation attached.
Letter of Decision after Reexamination in the Chinese Patent Application No. 201810836353.3, dated Feb. 9, 2022; English translation attached.

\* cited by examiner

MICROFLUIDIC APPARATUS, AND METHOD OF DETECTING SUBSTANCE IN MICROFLUIDIC APPARATUS

CROSS-REFERENCE TO RELATED APPLICATION

This application is a national stage application under 35 U.S.C. § 371 of International Application No. PCT/CN2019/085562, filed May 5, 2019, which claims priority to Chinese Patent Application No. 201810837019.X, filed Jul. 26, 2018, Chinese Patent Application No. 201810836353.3, filed Jul. 26, 2018, Chinese Patent Application No. 201810844548.2, filed Jul. 27, 2018, and Chinese Patent Application No. 201810930403.4, filed Aug. 15, 2018. Each of the forgoing applications is herein incorporated by reference in its entirety for all purposes

TECHNICAL FIELD

The present invention relates to optical technology and microfluidic technology, more particularly, to a microfluidic apparatus, and a method of detecting a substance in a microfluidic apparatus.

BACKGROUND

In present, microfluidic apparatus are widely used in physical, biological, and chemical fields for material analysis, molecular diagnostics, food quarantine, and bacterial classification.

SUMMARY

In one aspect, the present invention provides a microfluidic apparatus, comprising a first substrate having a first side and a second side opposite to each other; a grating layer on the second side of the first substrate, the grating layer comprising a plurality of grating blocks of different wavelength selectivity; a second substrate having a third side and a fourth side opposite to each other; the fourth side of the second substrate on a side of the third side away from the first substrate, and the second side of the first substrate on a side of the first side away from the second substrate; a light detection layer on the third side of the second substrate, the light detection layer comprising a plurality of detectors; and a microfluidic layer between the first substrate and the light detection layer, the microfluidic layer comprising a plurality of microfluidic channels; wherein a respective grating block of a selected wavelength selectivity of the plurality of grating blocks of different wavelength selectivity is optically coupled to a respective one of the plurality of microfluidic channels, and configured to diffract light emitted from a light source into substantially collimated light having a selected wavelength range toward the respective one of the plurality of microfluidic channels; a respective one of the plurality of detectors is optically coupled to the respective grating block of the selected wavelength selectivity of the plurality of grating blocks of diffracted wavelength selectivity, and configured to detect the substantially collimated light diffracted by the respective grating block of the selected wavelength selectivity of the plurality of grating blocks of different wavelength selectivity and transmitting through the respective one of the plurality of microfluidic channels; and the substantially collimated light diffracted by the respective grating block of the selected wavelength selectivity of the plurality of grating blocks transmits along a direction substantially perpendicular to the second side of the first substrate.

Optionally, multiple grating blocks of the plurality of grating blocks are configured to receive incident light from the light source respectively at different incident angles, and configured to diffract light into substantially collimated light toward multiple microfluidic channels of the plurality of microfluidic channels respectively along the direction substantially perpendicular to the second side of the first substrate.

Optionally, different grating blocks of different wavelength selectivity of the plurality of grating blocks diffract light emitted from the light source into substantially collimated light having different wavelength ranges respectively toward different microfluidic channels of the plurality of microfluidic channels.

Optionally, the plurality of grating blocks and the plurality of detectors constitute a plurality of detection units for respectively detecting parameters respectively in the plurality of microfluidic channels; and wherein the microfluidic apparatus further comprises a first black matrix layer spacing apart the plurality of detectors and a second black matrix layer spacing apart the plurality of grating blocks, to reduce or eliminate inter-unit interference among the plurality of detection units.

Optionally, the microfluidic layer comprises a plurality of regions; wherein microfluidic channels in a respective one of the plurality of regions having a same fluid flow direction; and microfluidic channels in different regions of the plurality of regions have different fluid flow directions.

Optionally, the microfluidic layer comprises one or more microfluidic retrieving channels, a respective one of which being connected to the microfluidic channels having the same fluid flow direction in the respective one of the plurality of regions.

Optionally, the one or more microfluidic retrieving channels segregate the microfluidic layer into the plurality of regions.

Optionally, the plurality of grating blocks of different wavelength selectivity comprise a first grating block of a first wavelength selectivity and a second grating block of a second wavelength selectivity; the plurality of detectors comprises a first detector and a second detector; and the plurality of microfluidic channels comprises a first microfluidic channel and a second microfluidic channel; wherein the first grating block of the first wavelength selectivity diffracts light emitted from the light source into substantially collimated light having a first wavelength range toward the first microfluidic channel; the first detector detects the substantially collimated light having the first wavelength range diffracted by the first grating block of the first wavelength selectivity and transmitting through the first microfluidic channel; the second grating block of the second wavelength selectivity diffracts light emitted from the light source into substantially collimated light having a second wavelength range toward the second microfluidic channel; the second detector detects the substantially collimated light having the second wavelength range diffracted by the second grating block of the second wavelength selectivity and transmitting through the second microfluidic channel.

Optionally, the respective one of the plurality of grating blocks comprises substantially parallel fringes; the substantially parallel fringes are substantially perpendicular to a plane, containing the light source, an orthographic projection of the light source on the second side of the first substrate, and a point of a respective one of the substantially parallel fringes where light f to the light source irradiates.

Optionally, an orthographic projection of the respective one of the plurality of detectors on the second side of the first substrate at least partially overlaps an orthographic projection of the respective one of the plurality of grating blocks on the second side of the first substrate; and an orthographic projection of the respective one of the plurality of microfluidic channels on the second side of the first substrate at least partially overlaps the orthographic projection of the respective one of the plurality of grating blocks on the second side of the first substrate.

Optionally, the respective one of the plurality of grating blocks is a volume Bragg grating.

In another aspect, the present invention provides a method of detecting a substance in a microfluidic apparatus, comprising providing a first substrate having a first side and a second side opposite to each other; providing a light source on the first side of the first substrate; providing a grating layer on the second side of the first substrate, the grating layer comprising a plurality of grating blocks of different wavelength selectivity; providing a second substrate having a third side and a fourth side opposite to each other; the fourth side of the second substrate on a side of the third side away from the first substrate, and the second side of the first substrate on a side of the first side away fin the second substrate; providing a light detection layer on the third side of the second substrate, the light detection layer comprising a plurality of detectors; providing a microfluidic layer between the first substrate and the light detection layer, the microfluidic layer comprising a plurality of microfluidic channels; respectively diffracting light emitted from the light source into substantially collimated light having a selected wavelength range toward the respective one of the plurality of microfluidic channels a respective grating block of a selected wavelength selectivity of the plurality of grating blocks of different wavelength selectivity; and respectively detecting the substantially collimated light diffracted by the respective grating block of the selected wavelength selectivity of the plurality of grating blocks of different wavelength selectivity and transmitting through the respective one of the plurality of microfluidic channels using a respective one of the plurality of detectors; wherein the substantially collimated light diffracted by the respective grating block of the selected wavelength selectivity of the plurality of grating blocks transmits along a direction substantially perpendicular to the second side of the first substrate.

Optionally, the method further comprises receiving incident light from the light source respectively at different incident angles using multiple grating blocks of the plurality of grating blocks; and diffracting light into substantially collimated light toward multiple microfluidic channels of the plurality of microfluidic channels respectively along the direction substantially perpendicular to the second side of the first substrate using multiple grating blocks of the plurality of grating blocks.

Optionally, the method further comprises receiving incident light from the light source respectively at different incident angles using the plurality of grating blocks; and diffracting light into substantially collimated light toward the plurality of microfluidic channels respectively along the direction substantially perpendicular to the second side of the first substrate using the plurality of grating blocks.

Optionally, the method further comprises diffracting light emitted from light source into substantially collimated light having different wavelength ranges respectively toward different microfluidic channels of the plurality of microfluidic channels using different grating blocks of different wavelength selectivity.

Optionally, the plurality of grating blocks and the plurality of detectors constitute a plurality of detection units for respectively detecting parameters respectively in the plurality of microfluidic channels; wherein the microfluidic apparatus further comprises a first black matrix layer spacing apart the plurality of detectors and a second black matrix layer spacing apart the plurality of grating blocks; and the method comprises reducing or eliminating inter-unit interference among the plurality of detection units using the first black matrix layer and the second black matrix layer.

Optionally, the method further comprises respectively aligning the plurality of detectors to the plurality of grating blocks along the direction substantially perpendicular to the second side of the first substrate; wherein an orthographic projection of the respective one of the plurality of detectors on the second side of the first substrate at least partially overlaps an orthographic projection of the respective one of the plurality of grating blocks on the second side of the first substrate; and an orthographic projection of the respective one of the plurality of microfluidic channels on the second side of the first substrate at least partially overlaps the orthographic projection of the respective one of the plurality of grating blocks on the second side of the first substrate.

Optionally, the plurality of grating blocks of different wavelength selectivity comprise a first grating block of a first wavelength selectivity and a second grating block of a second wavelength selectivity; the plurality of detectors comprises a first detector and a second detector; and the plurality of microfluidic channels comprises a first microfluidic channel and a second microfluidic channel; the method comprises diffracting light emitted from the light source into substantially collimated light having a first wavelength range toward the first microfluidic channel using the first grating block of the first wavelength selectivity; detecting the substantially collimated light having the first wavelength range diffracted by the first grating block of the first wavelength selectivity and transmitting through the first microfluidic channel using the first detector, diffracting light emitted from the light source into substantially collimated light having a second wavelength range toward the second microfluidic channel using the second grating block of the second wavelength selectivity; and detecting the substantially collimated light having the second wavelength range diffracted by the second grating block of the second wavelength selectivity and transmitting through the second microfluidic channel using the second detector.

Optionally, the respective one of the plurality of grating blocks comprises substantially parallel grating fringes; and the parallel grating fringes are perpendicular to a plane, containing the light source, an orthographic projection of the light source on the second side of the first substrate, and a point of a respective one of the parallel grating layers where light from the light source irradiates.

Optionally, the respective one of the plurality of grating blocks is a volume Bragg grating.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

A microfluidic apparatus may use light with a wavelength range or several wavelength ranges to detect substance such as stained cells. The light with a selected wavelength range or the light with several wavelength ranges is segregated from light emitted from a light source by a spectrometer in the microfluidic apparatus.

However, the spectrometer (e.g. a miniature quantum dot spectrometer) used in microfluidic apparatus have a complicated structure, and the method of fabricating the spectrometer is also complicated.

Accordingly, the present disclosure provides, inter alia, a microfluidic apparatus, and a method of detecting a substance in a microfluidic apparatus that substantially obviate one or more of the problems due to limitations and disadvantages of the related art. In one aspect, the present disclosure provides a microfluidic apparatus. In some embodiments, the microfluidic apparatus includes a first substrate having a first side and a second side opposite to each other; a grating layer on the second side of the first substrate, the grating layer including a plurality of grating blocks of different wavelength selectivity; a second substrate having a third side and a fourth side opposite to each other. Optionally, the fourth side of the second substrate is on a side of the third side away from the first substrate, and the second side of the first substrate on a side of the first side away from the second substrate. Optionally, the microfluidic apparatus includes a light detection layer on the third side of the second substrate. Optionally, the light detection layer includes a plurality of detectors. Optionally, the microfluidic apparatus includes a microfluidic layer between the first substrate and the light detection layer. Optionally, the microfluidic layer includes a plurality of microfluidic channels. Optionally, a respective grating block of a selected wavelength selectivity of the plurality of grating blocks of different wavelength selectivity is optically coupled to a respective one of the plurality of microfluidic channels. Optionally, the respective grating block of a selected wavelength selectivity of the plurality of grating blocks of different wavelength selectivity is configured to diffract light emitted from a light source into substantially collimated light having a selected wavelength range toward the respective one of the plurality of microfluidic channels. Optionally, a respective one of the plurality of detectors is optically coupled to the respective grating block of the selected wavelength selectivity of the plurality of grating blocks of different wavelength selectivity. Optionally, the respective one of the plurality of detectors is configured to detect the substantially collimated light diffracted by the respective grating block of the selected wavelength selectivity of the plurality of grating blocks of different wavelength selectivity and transmitting through the respective one of the plurality of microfluidic channels. Optionally, the substantially collimated light diffracted by the respective grating block of the selected wavelength selectivity of the plurality of grating blocks transmits along a direction substantially perpendicular to the second side of the first substrate. Optionally, the microfluidic apparatus further includes a light source on the first side of the first substrate.

As used herein, the term "substantially perpendicular" means that an angle is in the range of approximately 45 degrees to approximately 135 degrees, e.g., approximately 85 degrees to approximately 95 degrees, approximately 80 degrees to approximately 100 degrees, approximately 75 degrees to approximately 105 degrees, approximately 70 degrees to approximately 110 degrees, approximately 65 degrees to approximately 115 degrees, approximately 60 degrees to approximately 120 degrees.

As used herein, the term "substantially collimated light" refers to light having substantially the same direction and having substantially parallel rays. Optionally, the diverging angle of the substantially collimated light between an outmost light beam and a central light beam is no more than 10°, e.g. no more than 8°, no more than 6°, no more than 4°, no more than 2°. Optionally, the divergence of the substantially parallel rays is no more than 10°, e.g. no more than 8°, no more than 6°, no more than 4°, no more than 2°.

Figure 1:
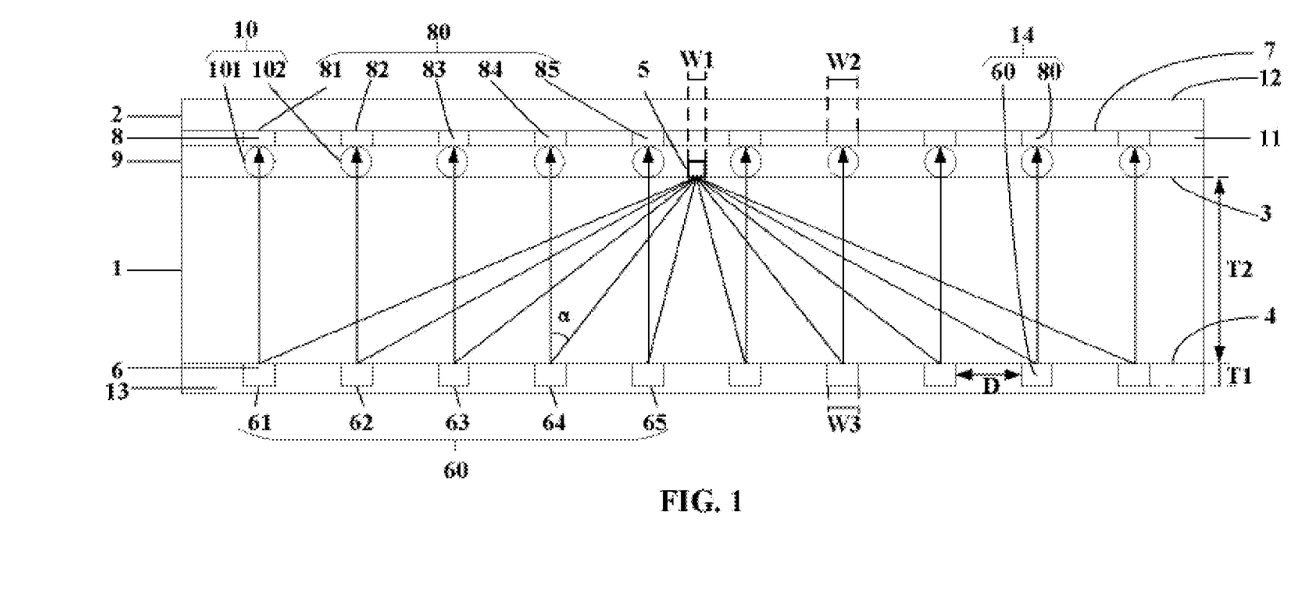
FIG. 1 is a cross-sectional view of a microfluidic apparatus in some embodiments according to the present disclosure.

FIG. 1 is a cross-sectional view of a microfluidic apparatus in some embodiments according to the present disclosure. Referring to FIG. 1, in some embodiments, a microfluidic apparatus includes a first substrate 1 having a first side 3 and a second side 4 opposite to each other; a light source 5 on the first side 3 of the first substrate 1; a grating layer 6 on the second side 4 of the first substrate 1. Optionally, the grating layer 6 includes a plurality of grating blocks 60 of different wavelength selectivity.

As used herein, the term "wavelength selectivity" refers to a respective one of the plurality of grating blocks selectively diffracting light of a selected wavelength range. Optionally, grating blocks of different wavelength selectivity respectively diffract light of different wavelength ranges (e.g. light of different colors). Optionally, grating blocks of different wavelength selectivity respectively diffract light of non-overlapping wavelength ranges. Optionally, grating blocks of the same wavelength selectivity diffract light of a same wavelength range (e.g. light of a same color).

Optionally, the microfluidic apparatus includes a second substrate 2 having a third side 7 and a fourth side 12 opposite to each other. For example, the fourth side 12 of the second substrate 2 is on a side of the third side 7 away from the first substrate 1. And the second side 4 of the first substrate 1 is on a side of the first side 3 away from the second substrate 2.

Optionally, the microfluidic apparatus includes a light detection layer 8 on the third side 7 of the second substrate 2. Optionally, the light detection layer 8 includes a plurality of detectors 80.

Optionally, the microfluidic apparatus includes a microfluidic layer 9 between the first substrate 1 and the light detection layer 8. Optionally, the microfluidic layer 9 includes a plurality of microfluidic channels 10.

In some embodiments, a respective grating block of a selected wavelength selectivity of the plurality of grating blocks 60 of different wavelength selectivity is optically coupled to a respective one of the plurality of microfluidic channels 10. Optionally, the respective grating block of the selected wavelength selectivity of the plurality of grating blocks 60 of different wavelength selectivity is configured to diffract light emitted from the light source 5 into substantially collimated light having a selected wavelength range toward the respective one of the plurality of microfluidic channels 10.

Optionally, a respective one of the plurality of detectors 80 is optically coupled to the respective grating block of the selected wavelength selectivity of the plurality of grating blocks 60 of different wavelength selectivity. Optionally, the respective one of the plurality of detectors 80 is configured to detect the substantially collimated light diffracted by the respective grating block of the selected wavelength selectivity of the plurality of grating blocks 60 of different wavelength selectivity and transmitting through the respective one of the plurality of microfluidic channels 10.

Optionally, the substantially collimated light diffracted by the respective grating block of the selected wavelength selectivity of the plurality of grating blocks 60 transmits along a direction substantially perpendicular to the second side 4 of the first substrate 1.

Optionally, multiple grating blocks of the plurality of grating blocks 60 are configured to receive incident light from the light source 5 respectively at different incident angles α, and configured to diffract light into substantially collimated light toward multiple microfluidic channels of the plurality of microfluidic channels 10 respectively along the direction substantially perpendicular to the second side 4 of the first substrate 1.

The incident angle α is an angle between a direction of light emitted from the light source 5 and irradiating at a respective one of the plurality of grating blocks 60 and a normal direction of the second side 4 of the first substrate 1.

Optionally, the plurality of grating blocks 60 are configured to receive incident light from the light source 5 respectively at different incident angles α, and configured to diffract light into substantially collimated light toward the plurality of microfluidic channels 10 respectively along the direction substantially perpendicular to the second side 4 of the first substrate 1.

Optionally, different grating blocks of different wavelength selectivity of the plurality of grating blocks 60 diffract light emitted from light source 5 into substantially collimated light having different wavelength ranges respectively toward different microfluidic channels of the plurality of microfluidic channels 10.

In some embodiments, the light source 5 is one or a combination of a light-emitting diode, a micro light-emitting diodes, and an organic light-emitting diode. Optionally, the light source 5 is a small size light source.

Various appropriate materials may be used for making the first substrate 1. Examples of materials suitable for making the first substrate 1 include, but are not limited to, glass materials.

For example, the plurality of grating blocks 60 are formed on a side of the glass substrate (e.g. the first substrate 1), and a light source 5 is disposed on the other side of the glass substrate (e.g. the first substrate 1).

Various appropriate materials may be used for making the second substrate 2. Examples of materials suitable for making the second substrate 2 include, but are not limited to, glass materials.

For example, the plurality of detectors 80 are formed on a side (e.g. the third side 7) of the glass substrate (e.g. the second substrate 2).

In some embodiments, the respective one of the plurality of grating blocks of different wavelength selectivity diffracted light emitted from light source 5 into substantially collimated light having the selected wavelength range. Optionally, a spectral width of the selected wavelength range is 5 nm. For example, there is a main wavelength within the selected wavelength range. A color of light having the selected wavelength range is determined by the main wavelength within the selected wavelength range.

Optionally, the respective one of the plurality of grating blocks 60 of different wavelength selectivity diffracts light emitted from light source 5 into substantially collimated light having a selected color (e.g. the selected wavelength range).

Optionally, different grating blocks of different wavelength selectivity of the plurality of grating blocks 60 diffract light emitted from light source 5 into substantially collimated light having different colors (e.g. different wavelength ranges) respectively toward different microfluidic channels of the plurality of microfluidic channels 10.

Optionally, the respective one of the plurality of grating blocks 60 is a volume Bragg grating. Optionally, a respective one of a plurality of volume Bragg gratings diffracted light emitted from the light source 5 into substantially collimated light having a selected color (e.g. light having a selected wavelength range).

In some embodiments, the plurality of grating blocks 60 of different wavelength selectivity includes a first grating block 61 of a first wavelength selectivity and a second grating block 62 of a second wavelength selectivity. The plurality of detectors 80 includes a first detector 81 and a second detector 82. The plurality of microfluidic channels 10 includes a first microfluidic channel 101 and a second microfluidic channel 102.

Optionally, the first grating block 61 of the first wavelength selectivity diffracts light emitted from the light source 5 into substantially collimated light having a first wavelength range toward the first microfluidic channel 101.

Optionally, the first detector 81 detects the substantially collimated light having the first wavelength range diffracted by the first grating block 61 of the first wavelength selectivity and transmitting through the first microfluidic channel 101.

Optionally, the second grating block 62 of the second wavelength selectivity diffracts light emitted from the light source into substantially collimated light having a second wavelength range toward the second microfluidic channel 102.

Optionally, the second detector 82 detects the substantially collimated light having the second wavelength range diffracted by the second grating block 62 of the second wavelength selectivity and transmitting through the second microfluidic channel 102.

Optionally, the light having the first wavelength range is selected from a group consisting of red light, green light, and blue light. Optionally, the light having the second wavelength range is selected from a group consisting of red light, green light, and blue light.

Various appropriate methods may be used for forming the plurality of grating blocks 60. Examples of methods suitable for forming the plurality of grating blocks 60 include, but are not limited to, using ultraviolet light to write gratings in a core material. Optionally, the core material includes photosensitive glass. For example, the core material is illuminated with ultraviolet light which induces structural changes of the core material, and the structural changes of the core material lead to a permanent modification of the refractive index of the core material.

Various methods may be used for forming the plurality of microfluidic channels 10. Examples of methods suitable of forming the plurality of microfluidic channels 10 include, but are not limited to, lithography and etching. In one example, the plurality of microfluidic channels 10 is formed by forming a photoresist material layer on the first side 3 of the first substrate 1; aligning a mask to the photoresist material layer; exposing the mask; removing the mask; and developing the photoresist material layer to form the plurality of microfluidic channels 10. In another example, the plurality of microfluidic channels 10 is formed using the lithography and etching.

Optionally, the plurality of microfluidic channels 10 can be formed using the lithography process or the etching process in a silicon substrate, a glass substrate, and a polymer (e.g. polydimethylsiloxane or polymethyl methacrylate) substrate. Subsequently, the plurality of microfluidic channels 10 is disposed on the first side 3 of the first substrate 1.

Optionally, a height of the respective one of the plurality of microfluidic channels 10 is at a nanoscale. Optionally, a width of the respective one of the plurality of microfluidic channels 10 is at a nanoscale.

In some embodiments, the plurality of detectors 80 and the plurality of grating blocks 60 are respectively aligned along the direction substantially perpendicular to the second side 4 of the first substrate 1.

As used herein, the term "aligned along the direction" refers to two objects are aligned so that a line connecting the two objects is substantially along a defined direction. Optionally, the divergence from the defined direction is no more than 10°, e.g. no more than 8°, no more than 6°, no more than 4°, no more than 2°, or no more than 1°. For example, referring to FIG. 1, the first detector 81 and the first grating block 61 are aligned along the direction substantially perpendicular to the second side 4 of the first substrate 1. The second detector 82 and the second grating block 62 are aligned along the direction substantially perpendicular to the second side 4 of the first substrate 1.

Optionally, an orthographic projection of the respective one of the plurality of detectors 80 on the second side 4 of the first substrate 1 at least partially overlaps an orthographic projection of the respective one of the plurality of grating blocks 60 on the second side 4 of the first substrate 1.

Optionally, an orthographic projection of the respective one of the plurality of microfluidic channels 10 on the second side 4 of the first substrate 1 at least partially overlaps the orthographic projection of the respective one of the plurality of grating blocks 60 on the second side 4 of the first substrate 1.

Optionally, the orthographic projection of the respective one of the plurality of detectors 80 on the second side 4 of the first substrate 1 covers an orthographic projection of the respective one of the plurality of grating blocks 60 on the second side 4 of the first substrate 1.

Optionally, the orthographic projection of the respective one of the plurality of microfluidic channels 10 on the second side 4 of the first substrate 1 covers the orthographic projection of the respective one of the plurality of grating blocks 60 on the second side 4 of the first substrate 1.

In some embodiments, the respective one of the plurality of detectors 80 is one or a combination of a charge coupled device (CCD), a complementary metal oxide semiconductor (CMOS), and a photodiode (PIN). Optionally, the respective one of the plurality of detectors 80 is a photosensor.

In some embodiments, the plurality of grating blocks 60 and the plurality of detectors 80 constitute a plurality of detection units 14 for respectively detecting parameters respectively in the plurality of microfluidic channels 10.

Figure 2:
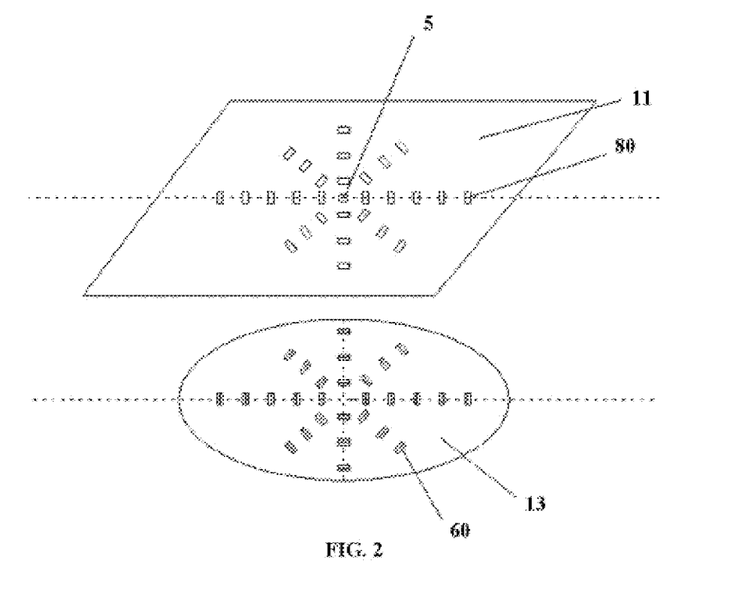
FIG. 2 is a schematic diagram of a structure of a microfluidic apparatus in some embodiments according to the present disclosure.

FIG. 2 is a schematic diagram of a structure of a microfluidic apparatus in some embodiments according to the present disclosure. Referring to FIG. 1 and FIG. 2, in some embodiments, the microfluidic apparatus further includes a first black matrix layer 11 spacing apart the plurality of detectors 80 and a second black matrix layer 13 spacing apart the plurality of grating blocks 60, to reduce or eliminate inter-unit interference among the plurality of detection units 14.

Optionally, the first black matrix layer 11 is configured to prevent light having a wavelength range other than the selected wavelength range from entering the respective one of the plurality of detectors 80. Optionally, it is unnecessary to dispose a collimating grating to collimate light diffracted by the respective one of the plurality of grating blocks 60 into light have a collimated direction toward the respective one of the plurality of detectors 80.

For example, the substantially collimated light diffracted by the plurality of grating blocks 60 can transmit directly to the respective one of the plurality of detectors 80, uncollimated light will not reach the respective one of the plurality of detectors 80, and be absorbed by the first black matrix layer 11, which may ensure the accuracy of the detection result using the microfluidic apparatus.

Optionally, the second black matrix layer 13 on the second side 4 of the first substrate 1 absorbs light irradiates on itself, which can restrain the incident angle $\alpha$ of the light emitted from the light source 5 toward the respective one of the plurality of grating blocks 60.

NM Various materials may be used for making the first black matrix layer 11 and the second black matrix layer 13. Examples of materials suitable for making the first black matrix layer 11 and the second black matrix layer 13 include, but are not limited to, black photoresist materials or metal materials.

In some embodiments, it is not necessary for the microfluidic apparatus to have a light source emitting collimated light, which will simplify the structure of the microfluidic apparatus and simplify the process of fabricating the microfluidic apparatus.

In some embodiments, the light source 5 on the first side 3 of the first substrate 1 emits light toward the plurality of grating blocks 60 on the second side 4 of the first substrate 1. The respective grating block of the selected wavelength selectivity of the plurality of grating blocks 60 of different wavelength selectivity diffracts light emitted flow the light source 5 into substantially collimated light having the selected wavelength range toward the respective one of the plurality of microfluidic channels 10. For example, the substantially collimated light diffracted by the respective grating block of the selected wavelength selectivity of the plurality of grating blocks 60 transmits along a direction substantially perpendicular to the second side 4 of the first substrate 1. Subsequently, the respective one of the plurality of detectors 80 detects the substantially collimated light diffracted by the respective grating block of the selected wavelength selectivity of the plurality of grating blocks 60 of different wavelength selectivity and transmitting through the respective one of the plurality of microfluidic channels 10. For example, the respective one of the plurality of detectors 80 detects parameters respectively in the plurality of microfluidic channels 10, including characters of a microfluid in the respective one of the plurality of microfluidic channels 10.

Figure 3A:
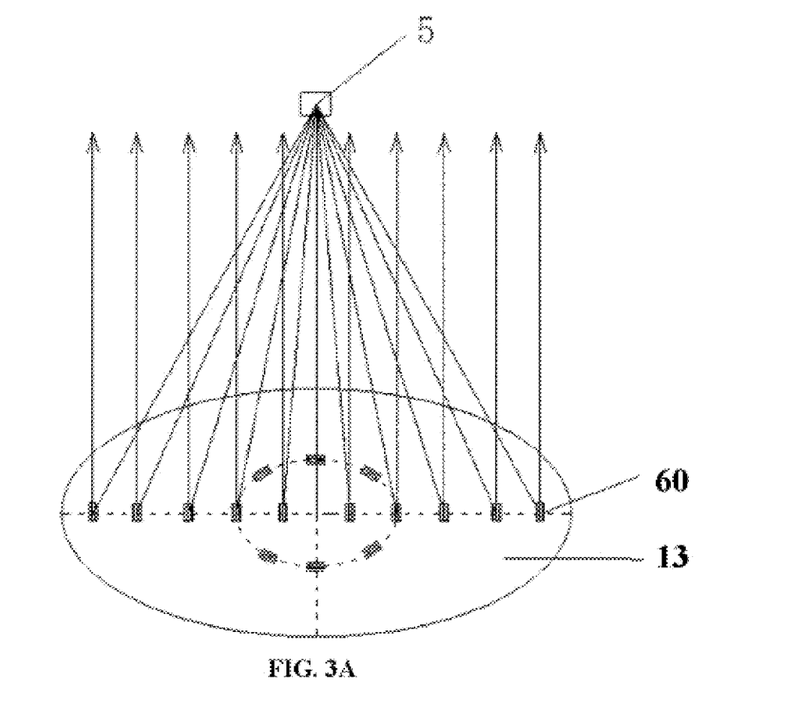
FIG. 3A is a schematic diagram illustrating relationships between a light source and a plurality of grating blocks in a microfluidic apparatus in some embodiments according to the present disclosure.
Figure 3B:
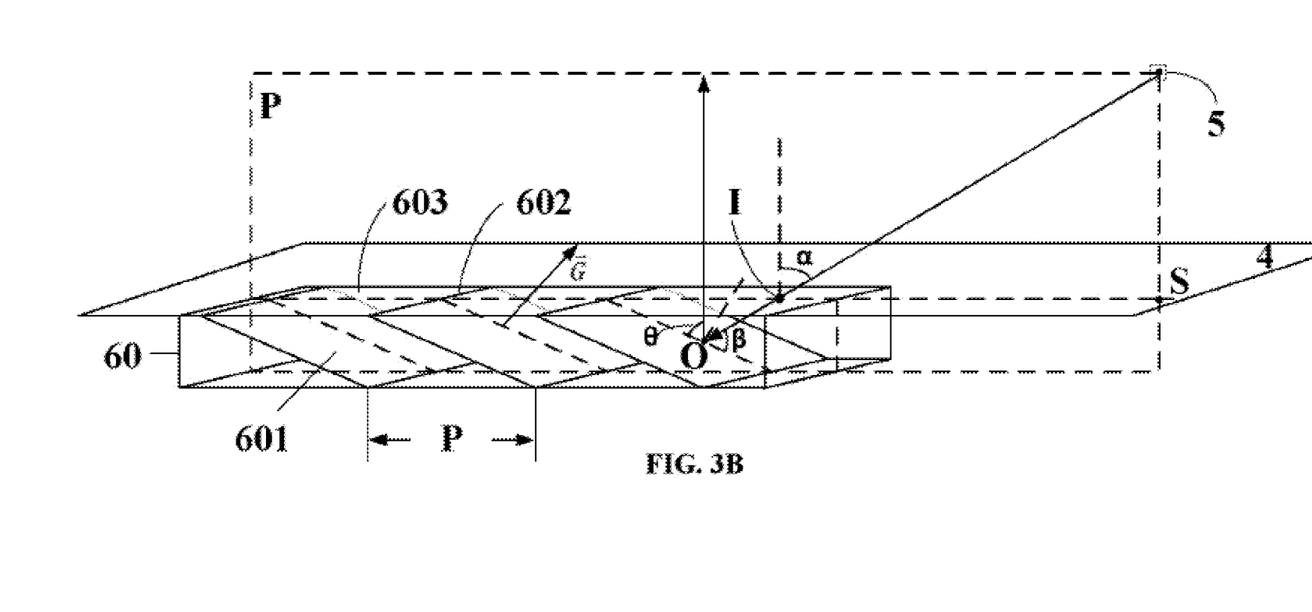
FIG. 3B is a schematic diagram illustrating light emitted from a light source and irradiating on a respective one of the plurality of grating blocks in some embodiments according to the present disclosure.

FIG. 3A is a schematic diagram illustrating relationships between a light source and a plurality of grating blocks in a microfluidic apparatus in some embodiments according to the present disclosure. FIG. 3B is a schematic diagram illustrating light emitted from a light source and irradiating on a respective one of the plurality of grating blocks in some embodiments according to the present disclosure. Referring to FIG. 3A and FIG. 3B, the respective one of the plurality of grating blocks 60 includes substantially parallel fringes 601. Optionally, the substantially parallel fringes 601 are perpendicular to a plane P, containing the light source 5, an orthographic projection S of the light source 5 on the second side 4 of the first substrate 1, and a point O of a respective one of the substantially parallel fringes 601 where light from the light source 5 irradiates.

As used herein, the term "substantially parallel" means that two directions having an included angle in the range of approximately 0 degree to approximately 5 degrees, e.g., approximately 0 degree to approximately 10 degrees, approximately 0 degree to approximately 15 degrees, approximately 0 degree to approximately 20 degrees, approximately 0 degree to approximately 25 degrees, approximately 0 degree to approximately 30 degrees, or 0 degree.

Optionally, fringe lines 602 are intersections of a surface 603 of the respective one of the plurality of grating blocks 60 closer to the second side 4 of the first substrate 1 and the substantially parallel fringes 601. Optionally, the fringe lines 602 are substantially parallel to each other.

Optionally, a point I is an intersection of light irradiating at the respective one of the plurality of grating blocks 60 and the surface 603 of the respective one of the plurality of grating blocks 60. Optionally, a line connecting the point I and the orthographic projection S is perpendicular to the fringe lines 602 of the respective one of the plurality of grating blocks 60.

Optionally, a grating vector $\vec{G}$ is along a normal direction of planes of a constant refractive index (e.g. planes containing substantially parallel fringes) of the respective one of the plurality of grating blocks 60. Optionally, the grating vector $\vec{G}$ of the respective one of the plurality of grating blocks 60 parallels to the plane P.

Optionally, fringe incident angle β between a direction of the light irradiating at the respective one of the plurality of grating blocks 60 and the substantially parallel fringes 601 equals to the fringe diffracted angle θ between a direction of the light diffracted by the respective one of the plurality of grating blocks 60 and the substantially parallel fringes 601.

Optionally, the light diffracted by the respective one of the plurality of grating blocks 60 transmits along the direction substantially perpendicular to the first substrate 1. Optionally, the light diffracted by the respective one of the plurality of grating blocks 60 transmits along a direction substantially perpendicular to the second substrate 2. This arrangement may simplify the structure of the microfluidic apparatus, and produce a distinct spectral distribution.

In some embodiments, fringe incident angle β, fringe diffracted angle θ, central wavelength of diffracted light, and spectral width of diffracted light could be properly chosen by varying of a thickness of the respective one of the plurality of grating blocks 60, a period P of refractive index modulation of the respective one of the plurality of grating blocks 60, and an direction of grating vector $\vec{G}$ of the respective one of the plurality of grating blocks 60.

The period P of the respective one of the plurality of grating blocks 60 and the fringe incident angle β can be designed to allow the light having the selected wavelength to be diffracted according to the following formula:

$$P = \frac{\lambda}{2 \times \sin\beta \times n}$$

wherein P represents a period of the respective one of the plurality of grating blocks 60; λ represents a wavelength of the light irradiating at and diffracted by the respective one of the plurality of grating blocks 60; β represents a fringe incident angle between a direction of the light irradiating at the respective one of the plurality of grating blocks 60 and the substantially parallel fringes 601 of the respective one of the plurality of grating blocks 60; and n represents an average refractive index of the respective one of the plurality of grating blocks 60.

Optionally, the incident angle α and the substantially parallel fringes and the substantially parallel fringes 601 determine the fringe incident angle β, and fringe incident angle β equals to the fringe diffracted angle θ. By designing the incident angle α and the substantially parallel fringes 601, the fringe diffracted angle θ is determined, and the direction of light diffracted by the respective one of the plurality of grating blocks 60 is determined.

Optionally, the incident angle α and the direction of grating vector $\vec{G}$ determine the fringe incident angle β, and fringe incident angle β equals to the fringe diffracted angle θ. By designing the incident angle α and direction of grating vector $\vec{G}$, the fringe diffracted angle θ is determined, and the direction of light diffracted by the respective one of the plurality of grating blocks 60 is determined.

In some embodiments, the respective one of the plurality of grating blocks 60 diffracts light having the selected wavelength range and the selected fringe incident angle. Optionally, light having wavelength range other than the selected wavelength range cannot be diffracted by the respective one of the plurality of grating blocks 60. For example, the light having wavelength range other than the selected wavelength range is transmitted through the respective one of the plurality of grating blocks 60. Optionally, light having fringe incident angle β other than the selected fringe incident angle is not diffracted by the respective one of the plurality of grating blocks 60. For example, light having fringe incident angle β other than the selected fringe incident angle is absorbed by the second black matrix layer 13. So, the respective grating block of the selected wavelength selectivity of the plurality of grating blocks 60 of different wavelength selectivity can diffract light emitted from the light source 5 into substantially collimated light having the selected wavelength range, which may solve the problems that a conventional spectrometer cannot separate light into light have a narrow wavelength range, the conventional spectrometer cannot accurately separate light, and the conventional spectrometer may have cross light interference.

In some embodiments, at least one of the plurality of grating blocks 60 is on a boundary of a circle having a center that is an orthographic projection S of the light source 5 on the second side 4 of the first substrate 1.

In some embodiments, referring to FIG. 3A, the substantial collimated light diffracted by the respective one of the plurality of grating blocks 60 is perpendicular to the first substrate 1 and the second substrate 2, and transmits to the respective one of the plurality of detectors 80. For example, if light irradiating at the respective one of the plurality of grating blocks 60 is diffracted into the substantial collimated light by the respective one of the plurality of grating blocks 60, plane P containing the light irradiating at the respective one of the plurality of grating blocks 60 and the substantial collimated light diffracted by the respective one of the plurality of grating blocks 60 also contains a line connecting the light source 5 and the orthographic projection S of the light source 5 on the second side 4 of the first substrate 1.

In some embodiments, referring to FIG. 3B, the respective one of the plurality of grating blocks 60 is a two dimensional grating. Optionally, the substantially parallel fringes 601 of the respective one of the plurality of grating blocks 60 is substantially perpendicular to the plane P, containing the light source 5, the orthographic projection S of the light source 5 on the second side 4 of the first substrate 1, and the point O of a respective one of the substantially parallel fringes 601 where light from the light source 5 irradiates.

Optionally, the line connecting the point I and the orthographic projection S is perpendicular to the fringe lines 602 of the respective one of the plurality of grating blocks 60.

Optionally, the grating vector $\vec{G}$ of the respective one of the plurality of grating blocks 60 parallels to the plane P.

Optionally, two grating blocks of the plurality of grating blocks 60 on a same boundary of a circle having the center that is an orthographic projection S can diffract light with two different wavelength ranges, although the incident angle α of light is the same, the directions of the light diffracted by the two grating blocks are the same, the mediums of the two grating blocks are the same, and the mediums (e.g. the first substrate 1) where the diffracted light transmits are the same. So, an arrangement of the plurality of grating blocks 60, an arrangement of the plurality of detectors 80 can be greatly simplified to segregate light into substantially collimated light having different wavelength ranges.

Figure 4A:
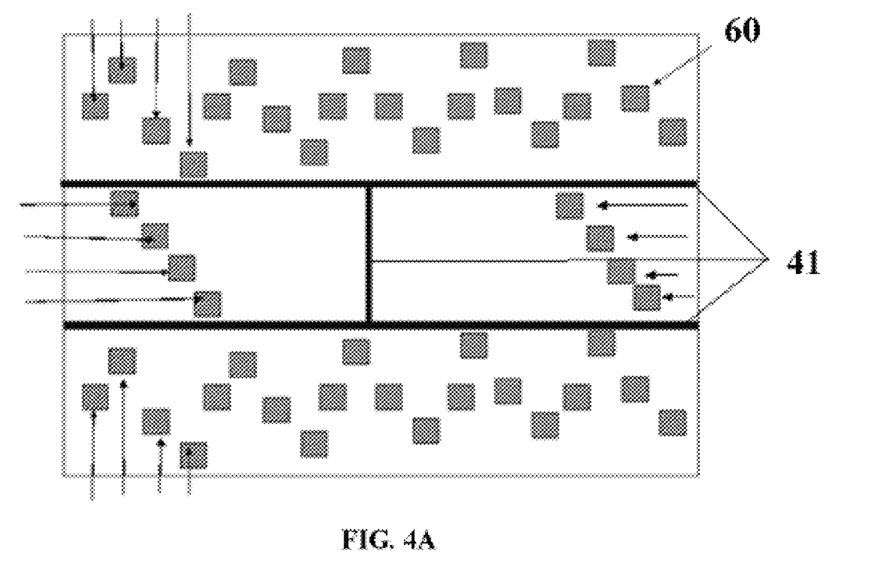
FIG. 4A is a schematic diagram of an arrange of a plurality of grating blocks in some embodiments according to the present disclosure.
Figure 4B:
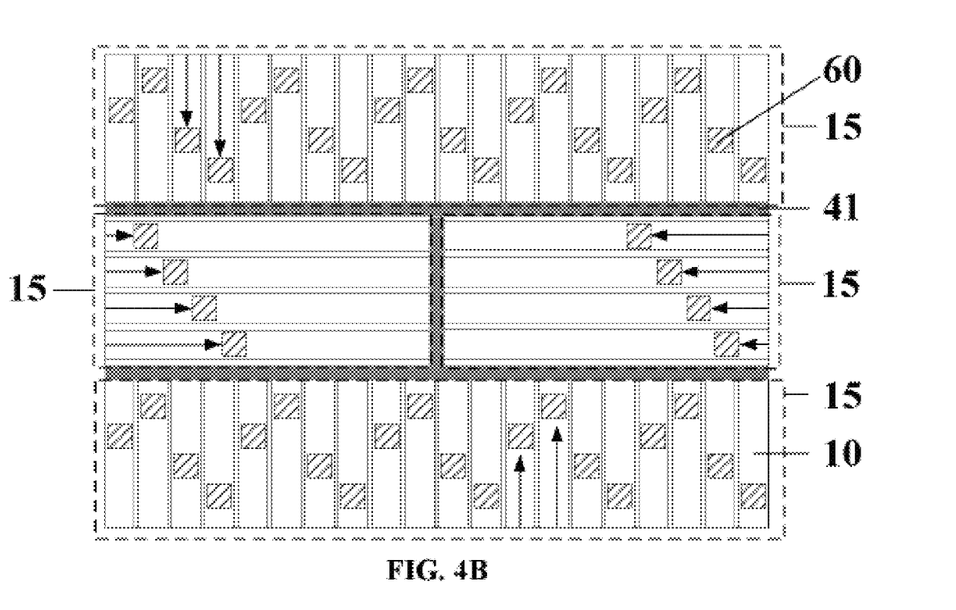
FIG. 4B is a schematic diagram illustrating relationships between a plurality of grating blocks and a plurality of microfluidic channels in some embodiments according to the present disclosure.

FIG. 4A is a schematic diagram of an arrange of a plurality of grating blocks in some embodiments according to the present disclosure. FIG. 4B is a schematic diagram illustrating relationships between a plurality of grating blocks and a plurality of microfluidic channels in some embodiments according to the present disclosure. Referring to both FIG. 4A and FIG. 4B, directions of arrows show the fluid flow directions of microfluidic in the plurality of microfluidic channels 10.

In some embodiments, light diffracted by the respective one of the plurality of grating blocks 60 is transmitted to the respective one of the plurality of microfluidic channels 10, which ensures that there is only light of a selected color transmitting through the respective one of the plurality of microfluidic channels 10. The respective one of the plurality of microfluidic channels 10 is used for a specific detection.

Optionally, light with the selected wavelength range diffracted by the respective grating of the selected wavelength selectivity of the plurality of grating blocks 60 of different wavelength selectivity is transmitted to the respective one of the plurality of microfluidic channels 10. Optionally, light diffracted by multiple grating blocks of the plurality of grating blocks 60 is transmitted to the respective one of the plurality of microfluidic channels 10. Optionally, different light diffracted by different grating blocks of different wavelength selectivity of the plurality of grating blocks 60 is transmitted to the respective one of the plurality of microfluidic channels 10.

In some embodiments, referring to FIG. 1 and FIG. 4B, the microfluidic layer 9 includes a plurality of regions 15. Optionally, the microfluidic channels in a respective one of the plurality of regions 15 having a same fluid flow direction. Optionally, the microfluidic channels in different regions of the plurality of regions 15 have different fluid flow directions.

In some embodiments, the microfluidic layer 9 includes one or more microfluidic retrieving channels 41. Optionally, the microfluidic retrieving channels 41 segregate the microfluidic layer 9 into the plurality of regions 15. Optionally, in the respective one of the plurality of regions 15, a respective one of one or more microfluidic retrieving channels 41 is connected to the microfluidic channels 10 having the same fluid flow direction. Optionally, microfluidic channels 10 in different regions of the plurality of regions 15 have different fluid flow direction. This arrangement of the microfluidic layer 9 may accommodate more microfluidic channels 10 in the microfluidic layer 9, therefore allowing the grating layer 6 to have more grating blocks corresponding to more microfluidic channels 10.

Having more grating blocks means light with more different wavelength ranges can be used for detections. Having more microfluidic channels means more detections can be performed at the same time.

Optionally, grating blocks of the plurality of grating blocks 60 are spaced apart from each other and misaligned with each other to make fully use of the space of the grating layer 6. Optionally, the grating blocks of the plurality of grating blocks 60 are spaced apart by the second black matrix layer 13.

For example, referring to both FIG. 1, FIG. 4A, and FIG. 4B, the microfluidic layer 9 includes three microfluidic retrieving channels. The three microfluidic retrieving channels segregate the microfluidic layer 9 into four regions. Grating blocks corresponding to a respective one of the four regions are spaced apart and misaligned to each other. Microfluidic channels in the respective one of the four regions have a same fluid flow direction. Microfluidic channels in different regions of the four regions have different fluid flow directions.

Referring to FIG. 1, in some embodiments, the light source 5 is a LED light source. Optionally, a first width W1 of the light source 5 is 200 µm. Optionally, light emitted from the light source 5 having a wavelength range from 380 nm to 780 nm. Optionally, a second width W2 of the respective one of the plurality of detectors 80 is 20 µm. Optionally, a third width W3 of the respective one of the plurality of grating blocks 60 is 100 μm. Optionally, a distance D between two direct adjacent grating blocks of the plurality of grating blocks 60 is 200 μm. Optionally, a first thickness T1 of the respective one of the plurality of grating blocks 60 is 70 μm. Optionally, a refractive index modulation of the respective one of the plurality of grating blocks 60 is 0.01. Optionally, a refractive index of the first substrate 1 is 1.52. Optionally, a second thickness T2 of the first substrate 1 is 2 mm.

In some embodiments, the plurality of grating blocks 60 include the first grating block 61 of the first wavelength selectivity, the second grating block 62 of the wavelength selectivity; a third grating block 63 of a third wavelength selectivity; a fourth grating block 64 of a fourth wavelength selectivity; and a fifth grating block 65 of a fifth wavelength selectivity.

Optionally, the respective one of the plurality of grating blocks 60 diffract light into substantially collimated light having a 5 nm wavelength range toward the respective one of the plurality of detectors 80. For example, the spectral width of light diffracted by the respective one of the plurality of grating blocks is 5 nm.

In one example, the first grating block 61 of the first wavelength selectivity diffracted light into substantially collimated light having the first wavelength range. The second grating block 62 of the wavelength selectivity diffracted light into substantially collimated light having the second wavelength range. The third grating block 63 of a third wavelength selectivity diffracted light into substantially collimated light having a third wavelength range. The fourth grating block 64 of a fourth wavelength selectivity diffracted light into substantially collimated light having a fourth wavelength range. The fifth grating block 65 of a fifth wavelength selectivity diffracted light into substantially collimated light having a fifth wavelength range.

In another example, a first main wavelength of substantially collimated light having the first wavelength range is 380 nm. A second main wavelength of substantially collimated light having the second wavelength range is 385 nm. A third main wavelength of substantially collimated light having the third wavelength range is 390 nm. A fourth main wavelength of substantially collimated light having the fourth wavelength range is 395 nm. A fifth main wavelength of substantially collimated light having the fifth wavelength range is 400 nm.

In some embodiments, the second black matrix layer 13 can restrain the incident angle α of the light emitted from the light source 5 toward the respective one of the plurality of grating blocks 60. Optionally, by absorbing light, the second black matrix layer 13 can keep a difference between incident angles of light irradiating at the respective one of the plurality of grating blocks 60 is within 4°.

Table 1 shows relationships between the respective one of the plurality of grating blocks 60, the incident angles α of light irradiating at the respective one of the plurality of grating blocks 60, the period of the respective one of the plurality of grating blocks 60, the wavelength range of substantially collimated light diffracted by the respective one of the plurality of grating blocks 60, and diverging angle of the substantially collimated light between an outmost light beam and a central light beam diffracted the respective one of the plurality of grating blocks 60.

TABLE 1

| Grating block | 61 | 62 | 63 | 64 | 65 |
| --- | --- | --- | --- | --- | --- |
| Incident angles α (°) of light irradiating at the grating block | 33-35 | 27-29 | 19-22 | 11-14 | 3-6 |
| Periods of grating block (nm) | 447 | 540 | 719 | 1160 | 3030 |
| Wavelength range (nm) of light diffracted by the grating block | 379-384 | 386-389 | 391-395 | 396-399 | 401-404 |
| Diverging angle (°) of the substantially collimated light diffracted the grating block | 1.5 | 1.5 | 2 | 2 | 2 |

Referring to Table 1, in some embodiments, the first grating block 61 of the first wavelength selectivity has a period of 447 nm. Light emitted from the light source 5 irradiates at the first grating block 61 at an incident angel range from 33° to 35°. Light irradiating at the first grating block 61 is diffracted into substantially collimated light having the first wavelength range from 379 nm to 384 nm. The substantially collimated light having the first wavelength range detected by the first detector 81 has a first diverging angle between an outmost light beam and a central light beam. The first diverging angle is 1.5°.

In some embodiments, the second grating block 62 of the second wavelength selectivity has a period of 540 nm. Light emitted from the light source 5 irradiates at the second grating block 62 at an incident angel range from 27° to 29°. Light irradiating at the second grating block 62 is diffracted into substantially collimated light having the second wavelength range from 386 nm to 389 nm. The substantially collimated light having the second wavelength range detected by the second detector 82 has a second diverging angle between an outmost light beam and a central light beam. The second diverging angle is 1.5°.

In some embodiments, the third grating block 63 of the third wavelength selectivity has a period of 719 nm. Light emitted from the light source 5 irradiates at the third grating block 63 at an incident angel range from 19° to 22°. Light irradiating at the third grating block 63 is diffracted into substantially collimated light having the third wavelength range from 391 nm to 395 nm. The substantially collimated light having the third wavelength range detected by a third detector 83 has a third diverging angle between an outmost light beam and a central light beam. The third diverging angle is 2°.

In some embodiments, the fourth grating block 64 of the fourth wavelength selectivity has a period of 1160 nm. Light emitted from the light source 5 irradiates at the fourth grating block 64 at an incident angel range from 11° to 14°. Light irradiating at the fourth grating block 64 is diffracted into substantially collimated light having the fourth wavelength range from 396 nm to 399 nm. The substantially collimated light having the fourth wavelength range detected by a fourth detector 84 has a fourth diverging angle between an outmost light beam and a central light beam. The third diverging angle is 2°.

In some embodiments, the fifth grating block 65 of the fifth wavelength selectivity has a period of 3030 nm. Light emitted from the light source 5 irradiates at the fifth grating block 65 at an incident angel range from 3° to 6°. Light irradiating at the fifth grating block 65 is diffracted into substantially collimated light having the fifth wavelength range from 401 nm to 404 nm. The substantially collimated light having the fifth wavelength range detected by a fifth detector 85 has a fifth diverging angle between an outmost light beam and the central light beam. The fifth diverging angle is 2°

FIG. 5A to FIG. 5E are schematic diagram illustrate diffraction efficiencies of five different grating blocks of a plurality of grating blocks in some embodiments according to the present disclosure.

Figure 5A:
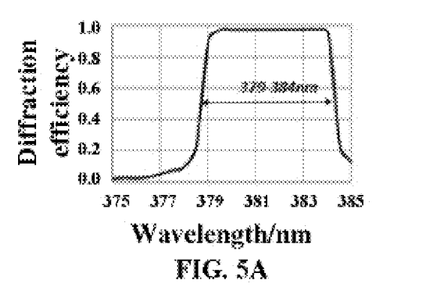
FIG. 5A to FIG. 5E are schematic diagram illustrate diffraction efficiencies of five different grating blocks of a plurality of grating blocks in some embodiments according to the present disclosure.

FIG. 5A shows the diffraction efficiency of the first grating block 61 of the first wavelength selectivity. The first grating block 61 of the first wavelength selectivity can diffract light into substantially collimated light having the first wavelength range from 379 nm to 384 nm.

Figure 5B:
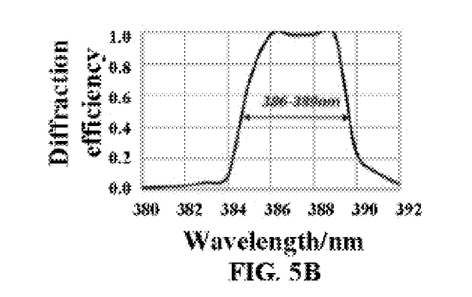

FIG. 5B shows the diffraction efficiency of the second grating block 62 of the second wavelength selectivity. The second grating block 62 of the second wavelength selectivity can diffract light into substantially collimated light having the second wavelength range from 386 nm to 389 nm.

Figure 5C:
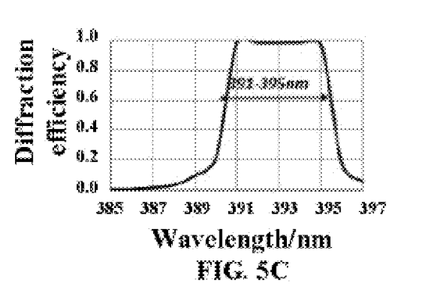

FIG. 5C shows the diffraction efficiency of the third grating block 63 of the third wavelength selectivity. The third grating block 63 of the third wavelength selectivity can diffract light into substantially collimated light having the third wavelength range from 391 mu to 395 nm.

Figure 5D:
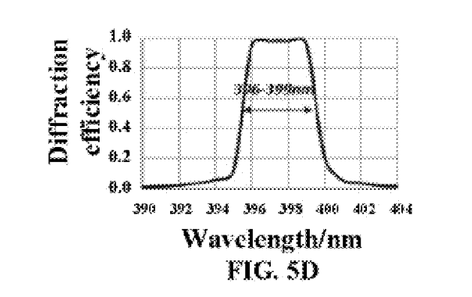

FIG. 5D shows the diffraction efficiency of the fourth grating block 64 of the fourth wavelength selectivity. The fourth grating block 64 of the fourth wavelength selectivity can diffract light into substantially collimated light having the fourth wavelength range from 396 nm to 399 nm.

Figure 5E:
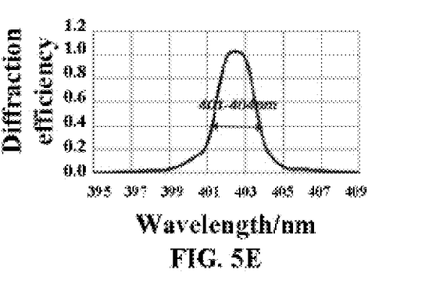

FIG. 5E shows the diffraction efficiency of the fifth grating block 65 of the fifth wavelength selectivity. The fifth grating block 65 of the fifth wavelength selectivity can diffract light into substantially collimated light having the fifth wavelength range from 401 nm to 404 nm.

In another aspect, the present disclosure also provides a method of detecting a substance in a microfluidic apparatus. In some embodiments, the method of detecting the substance in the microfluidic apparatus includes providing a first substrate having a first side and a second side opposite to each other; providing a light source on the first side of the first substrate; providing a grating layer on the second side of the first substrate. Optionally, the grating layer includes a plurality of grating blocks of different wavelength selectivity.

Optionally, the method of detecting the substance in the microfluidic apparatus includes providing a second substrate having a third side and a fourth side opposite to each other. Optionally, the fourth side of the second substrate is on a side of the third side away from the first substrate. Optionally, the second side of the first substrate is on a side of the first side away from the second substrate.

Optionally, the method of detecting the substance in the microfluidic apparatus includes providing a light detection layer on the third side of the second substrate. Optionally, the light detection layer include a plurality of detectors.

Optionally, the method of detecting the substance in the microfluidic apparatus includes providing a microfluidic layer between the first substrate and the light detection layer. Optionally, the microfluidic layer includes a plurality of microfluidic channels.

Optionally, the method of detecting the substance in the microfluidic apparatus includes respectively diffracting light emitted from the light source into substantially collimated light having a selected wavelength range toward the respective one of the plurality of microfluidic channels a respective grating block of a selected wavelength selectivity of the plurality of grating blocks of different wavelength selectivity; respectively detecting the substantially collimated light diffracted by the respective grating block of the selected wavelength selectivity of the plurality of grating blocks of different wavelength selectivity and transmitting through the respective one of the plurality of microfluidic channels using a respective one of the plurality of detectors.

Optionally, the substantially collimated light diffracted by the respective grating block of the selected wavelength selectivity of the plurality of grating blocks transmits along a direction substantially perpendicular to the second side of the first substrate.

Optionally, the method of detecting the substance in the microfluidic apparatus further includes receiving incident light from the light source respectively at different incident angles between a direction of light emitted limn the light source and irradiating at a respective one of the plurality of grating blocks and a normal direction of the second side of the first substrate, using multiple grating blocks of the plurality of grating blocks; and diffracting light into substantially collimated light toward multiple microfluidic channels of the plurality of microfluidic channels respectively along the direction substantially perpendicular to the second side of the first substrate using multiple grating blocks of the plurality of grating blocks.

Optionally, the method of detecting the substance in the microfluidic apparatus further includes receiving incident light from the light source respectively at different incident angles using the plurality of grating blocks; and diffracting light into substantially collimated light toward the plurality of microfluidic channels respectively along the direction substantially perpendicular to the second side of the first substrate using the plurality of grating blocks.

Optionally, the method of detecting the substance in the microfluidic apparatus further includes diffracting light emitted from light source into substantially collimated light having different wavelength ranges respectively toward different microfluidic channels of the plurality of microfluidic channels using different grating blocks of different wavelength selectivity.

In some embodiments, the plurality of grating blocks and the plurality of detectors constitute a plurality of detection units for respectively detecting parameters respectively in the plurality of microfluidic channels. Optionally, the microfluidic apparatus further includes a first black matrix layer spacing apart the plurality of detectors and a second black matrix layer spacing apart the plurality of grating blocks. Optionally, the method further includes reducing or eliminating inter-unit interference among the plurality of detection units using the first black matrix layer and the second black matrix layer.

In some embodiments, the method of detecting the substance in the microfluidic apparatus further includes respectively aligning the plurality of detectors to the plurality of grating blocks along the direction substantially perpendicular to the second side of the first substrate. Optionally, an orthographic projection of the respective one of the plurality of detectors on the second side of the first substrate at least partially overlaps an orthographic projection of the respective one of the plurality of grating blocks on the second side of the first substrate. Optionally, an orthographic projection of the respective one of the plurality of microfluidic channels on the second side of the first substrate at least partially overlaps the orthographic projection of the respective one of the plurality of grating blocks on the second side of the first substrate.

In some embodiments, the plurality of grating blocks of different wavelength selectivity include a first grating block of a first wavelength selectivity and a second grating block of a second wavelength selectivity. The plurality of detectors includes a first detector and a second detector. The plurality of microfluidic channels includes a first microfluidic channel and a second microfluidic channel.

Optionally, the method of detecting the substance in the microfluidic apparatus includes diffracting light emitted from the light source into substantially collimated light having a first wavelength range toward the first microfluidic channel using the first grating block of the first wavelength selectivity; detecting the substantially collimated light having the first wavelength range diffracted by the first grating block of the first wavelength selectivity and transmitting through the first microfluidic channel using the first detector; diffracting light emitted from the light source into substantially collimated light having a second wavelength range toward the second microfluidic channel using the second grating block of the second wavelength selectivity; and detecting the substantially collimated light having the second wavelength range diffracted by the second grating block of the second wavelength selectivity and transmitting through the second microfluidic channel using the second detector.

In some embodiments, the respective one of the plurality of grating blocks includes substantially parallel grating fringes. Optionally, the parallel grating layers are perpendicular to a plane, containing the light source, an orthographic projection of the light source on the second side of the first substrate, and a point of a respective one of the parallel grating fringes where light from the light source irradiates.

In some embodiments, the respective one of the plurality of grating blocks is a volume Bragg grating.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A microfluidic apparatus, comprising:
   a first substrate having a first side and a second side opposite to each other;
   a grating layer on the second side of the first substrate, the grating layer comprising a plurality of grating blocks of different wavelength selectivity;
   a second substrate having a third side and a fourth side opposite to each other; the fourth side of the second substrate on a side of the third side away from the first substrate, and the second side of the first substrate on a side of the first side away from the second substrate;
   a light detection layer on the third side of the second substrate, the light detection layer comprising a plurality of detectors; and
   a microfluidic layer between the first substrate and the light detection layer, the microfluidic layer comprising a plurality of microfluidic channels;
   wherein a respective grating block of a selected wavelength selectivity of the plurality of grating blocks of different wavelength selectivity is optically coupled to a respective one of the plurality of microfluidic channels, and configured to diffract light emitted from a light source into substantially collimated light having a selected wavelength range toward the respective one of the plurality of microfluidic channels;
   a respective one of the plurality of detectors is optically coupled to the respective grating block of the selected wavelength selectivity of the plurality of grating blocks of different wavelength selectivity, and configured to detect the substantially collimated light diffracted by the respective grating block of the selected wavelength selectivity of the plurality of grating blocks of different wavelength selectivity and transmitting through the respective one of the plurality of microfluidic channels; and
   the substantially collimated light diffracted by the respective grating block of the selected wavelength selectivity of the plurality of grating blocks transmits along a direction substantially perpendicular to the second side of the first substrate;
   wherein the plurality of grating blocks and the plurality of detectors constitute a plurality of detection units for respectively detecting parameters respectively in the plurality of microfluidic channels; and
   wherein the microfluidic apparatus further comprises a first black matrix layer spacing apart the plurality of detectors and a second black matrix layer spacing apart the plurality of grating blocks, to reduce or eliminate inter-unit interference among the plurality of detection units.

2. The microfluidic apparatus of claim 1, wherein multiple grating blocks of the plurality of grating blocks are configured to receive incident light from the light source respectively at different incident angles, and configured to diffract light into substantially collimated light toward multiple microfluidic channels of the plurality of microfluidic channels respectively along the direction substantially perpendicular to the second side of the first substrate.

3. The microfluidic apparatus of claim 1, wherein different grating blocks of different wavelength selectivity of the plurality of grating blocks diffract light emitted from the light source into substantially collimated light having different wavelength ranges respectively toward different microfluidic channels of the plurality of microfluidic channels.

4. The microfluidic apparatus of claim 1, wherein the microfluidic layer comprises a plurality of regions;
wherein microfluidic channels in a respective one of the plurality of regions having a same fluid flow direction; and
microfluidic channels in different regions of the plurality of regions have different fluid flow directions.

5. The microfluidic apparatus of claim 4, wherein the microfluidic layer comprises one or more microfluidic retrieving channels, a respective one of which being connected to the microfluidic channels having the same fluid flow direction in the respective one of the plurality of regions.

6. The microfluidic apparatus of claim 5, wherein the one or more microfluidic retrieving channels segregate the microfluidic layer into the plurality of regions.

7. The microfluidic apparatus of claim 1, wherein
the plurality of grating blocks of different wavelength selectivity comprise a first grating block of a first wavelength selectivity and a second grating block of a second wavelength selectivity;
the plurality of detectors comprises a first detector and a second detector; and
the plurality of microfluidic channels comprises a first microfluidic channel and a second microfluidic channel;
wherein the first grating block of the first wavelength selectivity diffracts light emitted from the light source into substantially collimated light having a first wavelength range toward the first microfluidic channel;
the first detector detects the substantially collimated light having the first wavelength range diffracted by the first grating block of the first wavelength selectivity and transmitting through the first microfluidic channel;
the second grating block of the second wavelength selectivity diffracts light emitted from the light source into substantially collimated light having a second wavelength range toward the second microfluidic channel; and
the second detector detects the substantially collimated light having the second wavelength range diffracted by the second grating block of the second wavelength selectivity and transmitting through the second microfluidic channel.

8. The microfluidic apparatus of claim 1, wherein the respective one of the plurality of grating blocks comprises substantially parallel fringes.

9. The microfluidic apparatus of claim 1, wherein the respective one of the plurality of grating blocks is a volume Bragg grating.

10. A method of detecting a substance in a microfluidic apparatus, comprising:
providing a first substrate having a first side and a second side opposite to each other;
providing a light source on the first side of the first substrate;
providing a grating layer on the second side of the first substrate, the grating layer comprising a plurality of grating blocks of different wavelength selectivity;
providing a second substrate having a third side and a fourth side opposite to each other; the fourth side of the second substrate on a side of the third side away from the first substrate, and the second side of the first substrate on a side of the first side away from the second substrate;
providing a light detection layer on the third side of the second substrate, the light detection layer comprising a plurality of detectors;
providing a microfluidic layer between the first substrate and the light detection layer, the microfluidic layer comprising a plurality of microfluidic channels;
respectively diffracting light emitted from the light source into substantially collimated light having a selected wavelength range toward the respective one of the plurality of microfluidic channels a respective grating block of a selected wavelength selectivity of the plurality of grating blocks of different wavelength selectivity; and
respectively detecting the substantially collimated light diffracted by the respective grating block of the selected wavelength selectivity of the plurality of grating blocks of different wavelength selectivity and transmitting through the respective one of the plurality of microfluidic channels using a respective one of the plurality of detectors;
wherein the substantially collimated light diffracted by the respective grating block of the selected wavelength selectivity of the plurality of grating blocks transmits along a direction substantially perpendicular to the second side of the first substrate;
wherein the plurality of grating blocks and the plurality of detectors constitute a plurality of detection units for respectively detecting parameters respectively in the plurality of microfluidic channels; and
wherein the microfluidic apparatus further comprises a first black matrix layer spacing apart the plurality of detectors and a second black matrix layer spacing apart the plurality of grating blocks, to reduce or eliminate inter-unit interference among the plurality of detection units.

11. The method of claim 10, further comprising
receiving, by multiple grating blocks of the plurality of grating blocks respectively positioned at different incident angles with respect to the light source, incident light from the light source; and
diffracting light into substantially collimated light toward multiple microfluidic channels of the plurality of microfluidic channels along the direction substantially perpendicular to the second side of the first substrate using multiple grating blocks of the plurality of grating blocks.

12. The method of claim 10, further comprising:
receiving, by the plurality of grating blocks respectively positioned at different incident angles with respect to the light source, incident light from the light source; and
diffracting light into substantially collimated light toward the plurality of microfluidic channels along the direction substantially perpendicular to the second side of the first substrate using the plurality of grating blocks.

13. The method of claim 10, further comprising diffracting light emitted from light source into substantially collimated light having different wavelength ranges respectively toward different microfluidic channels of the plurality of microfluidic channels using different grating blocks of different wavelength selectivity.

14. The method of claim 10, wherein the plurality of grating blocks and the plurality of detectors constitute a plurality of detection units for respectively detecting parameters respectively in the plurality of microfluidic channels;

wherein the microfluidic apparatus further comprises a first black matrix layer spacing apart the plurality of detectors and a second black matrix layer spacing apart the plurality of grating blocks; and the method comprises reducing or eliminating inter-unit interference among the plurality of detection units using the first black matrix layer and the second black matrix layer.

15. The method of claim 10, further comprising respectively aligning the plurality of detectors to the plurality of grating blocks along the direction substantially perpendicular to the second side of the first substrate.

16. The method of claim 10, wherein the plurality of grating blocks of different wavelength selectivity comprise a first grating block of a first wavelength selectivity and a second grating block of a second wavelength selectivity;

the plurality of detectors comprises a first detector and a second detector; and the plurality of microfluidic channels comprises a first microfluidic channel and a second microfluidic channel;

the method comprises:

diffracting light emitted from the light source into substantially collimated light having a first wavelength range toward the first microfluidic channel using the first grating block of the first wavelength selectivity;

detecting the substantially collimated light having the first wavelength range diffracted by the first grating block of the first wavelength selectivity and transmitting through the first microfluidic channel using the first detector;

diffracting light emitted from the light source into substantially collimated light having a second wavelength range toward the second microfluidic channel using the second grating block of the second wavelength selectivity; and detecting the substantially collimated light having the second wavelength range diffracted by the second grating block of the second wavelength selectivity and transmitting through the second microfluidic channel using the second detector.

17. The method of claim 10, wherein the respective one of the plurality of grating blocks comprises substantially parallel grating fringe.

18. The method of claim 10, wherein the respective one of the plurality of grating blocks is a volume Bragg grating.

\* \* \* \* \*